United States Patent Office 3,515,999
Patented June 2, 1970

3,515,999

DEMODULATOR FOR A MULTIVALENT TELEGRAPHIC SIGNAL

Jean Royer, Paris, France, assignor to C.I.T.-Compagnie Industrielle des Telecommunications, Paris, France Filed Feb. 14, 1968, Ser. No. 705,441
Claims priority, application France, Feb. 17, 1967, 95,512
Int. Cl. H03k *9/00*
U.S. Cl. 329—104 12 Claims

ABSTRACT OF THE DISCLOSURE

Demodulation circuit comprising $(n-1)$ auto-correlation lines each of which the incident signal is multiplied by the identical signal delayed by a constant value, the corresponding dephasing having the same value in each line for one of the $(n-1)$ intermediate frequencies between the $n$ modulation frequencies. Control signals are extracted from the $(n-1)$ lines output for a variable amplitude limiter to which is applied the wave coming from an $n$th auto-correlation line: from this limiter are extracted the characteristic signals which serve the purpose of synchronizing a clock which is used by a transcoder in order to restore the bivalent telegraphic signals in series.

The present invention relates to a demodulator for a multivalent telegraphic signal, intended for a carrier wave modulated by a more than bivalent telegraphic signal, and more specifically for a wave frequency-modulated by means of a multivalent telegraphic signal, although the invention may also be applied for other kinds of modulation, for example phase modulation.

It is known that a frequency modulated wave of the bivalent modulation type may be demodulated by feeding the incident wave into a bandpass filter, and then by feeding the wave issuing from the said filter on the one hand, and the same wave dephased or delayed a period equal to a fraction of the order of half a telegraphic instant on the other hand, to a modulator. The "auto-correlation" function engendered by the product of the two direct and dephased waves, reproduces the original telegraphic modulation after being applied to a low-pass filter eliminating products of higher order, followed by a re-forming amplitude limiter.

In the case of a multivalent modulation, the demodulation problem consists of identifying the instant and nature of the transitions and of applying the data thus obtained to an element known per se, being a so-called "transcoder," which recombines these with synchronized chronological signals organized to re-create the original telegraphic data by performing a parallel-series conversion in reverse order to that performed during transmission in the series-parallel sense.

It is accepted that the time of transition from one frequency to another is of the order of magnitude of a telegraphic instant.

According to the invention, an $n$-valency demodulation device comprises $(n-1)$ auto-correlation lines, whose outlets set in parallel on $(n-1)$ input points of a transcoder, plus an $n$th auto-correlation line, the said $(n-1)$ auto-correlation lines each having an output point connected to a transition detector element comprising a register incorporating two binary switch-over elements or flip-flops or the like, which at any instant generate analogical signals at the output point of the corresponding line, characteristic of the frequency during the last two instants, an aggregation of analogical circuits identifying the transition frequencies according to the data stored in the memory bank of the said two registers, a variable threshold amplitude limiter which at $(2n-3)$ input points receives orders originating from the said aggregation, and at one input point receives the signal output from the said $n$th auto-correlation line, the output of the said variable threshold amplitude limiter being employed to synchronize a timepiece ensuring the advance of the said registers, the so-called clock signals equally being applied to the said transcoder whose output provides elementary binary signs.

Each valency of the wave received is distinguished by a characteristic frequency. Accepting that the variation in frequency occurs almost linearly between an initial frequency and a final frequency in a signal of limited spectrum, the instant characteristic of modulation corresponds to transition through the median frequency between the initial and final frequencies. The logging of the characteristic instants serves the purpose of synchronizing a clock whose output signals are applied to a transcoder whereof $(n-1)$ input points receive the output signals of $(n-1)$ correlation lines.

The possible number of transitions in a modulation employing $n$ valencies, amounts to $n\times(n-1)$. The number of transition frequencies is equal to $(2n-3)$: in point of fact, this is the result of adding the total number of frequencies minus the extreme frequencies, that is to say $(n-2)$, to the number of median frequencies, that is to say $(n-1)$.

The signals issuing from the amplitude limiters of the $(n-1)$ correlation lines are fed to the input of a memory storage device which renders it possible to ascertain their states during the period of two telegraphic instants, which device advantageously consists of shifting registers controlled by the synchronous timing mechanism. The analogical circuits render it possible to identify the frequency transition performed by modulation, by considering the state of the $(n-1)$ amplitude limiters during two successive telegraphic instants. The variable chopping threshold amplitude limiter is set to one of the $(2n-3)$ level values corresponding to the intermediate frequency characteristic of the transition in question.

The invention will now be described with reference to the accompanying drawings, which illustrate the invention, but in no restrictive sense.

Figure 8A:
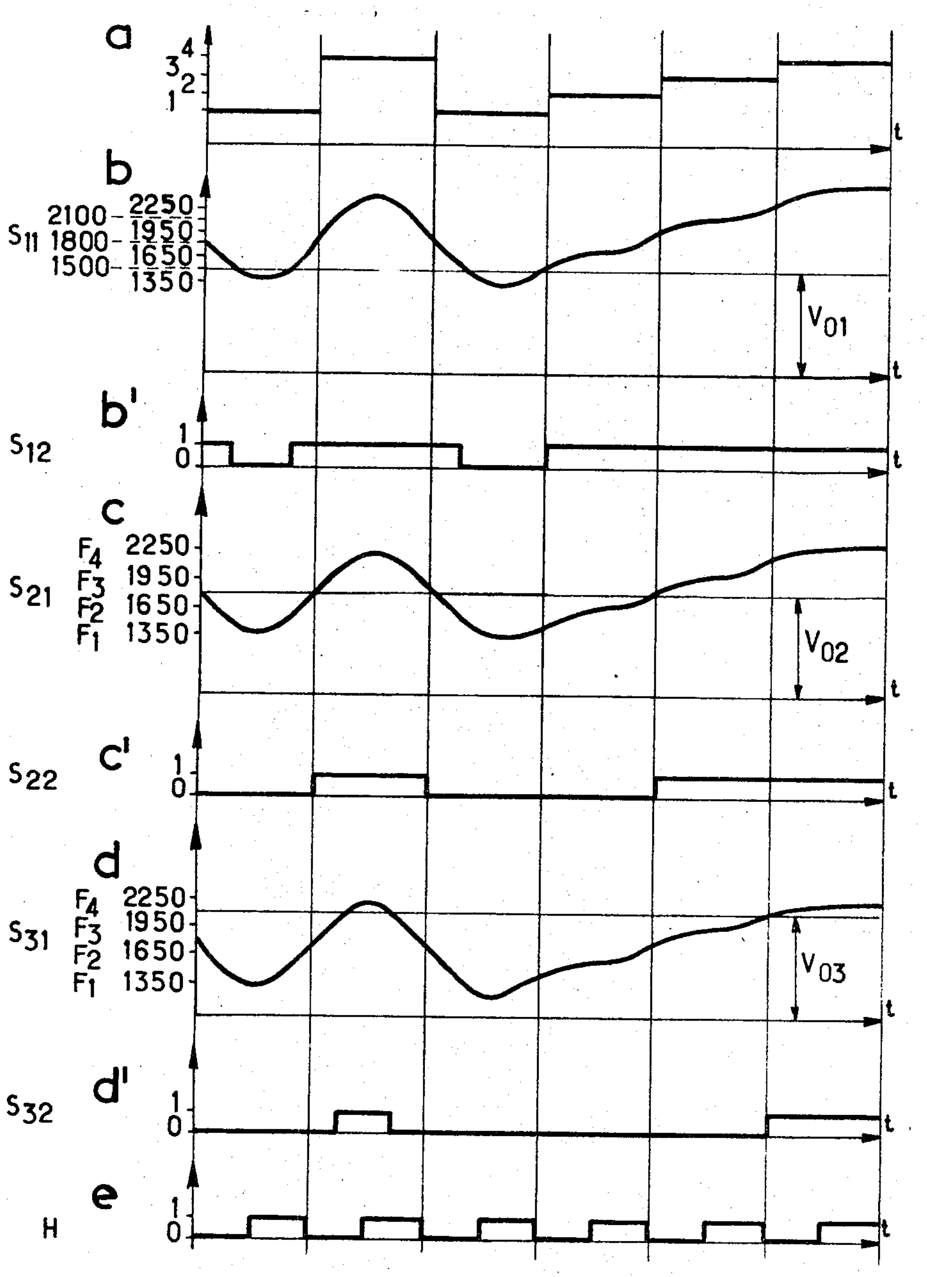
Figure 8B:
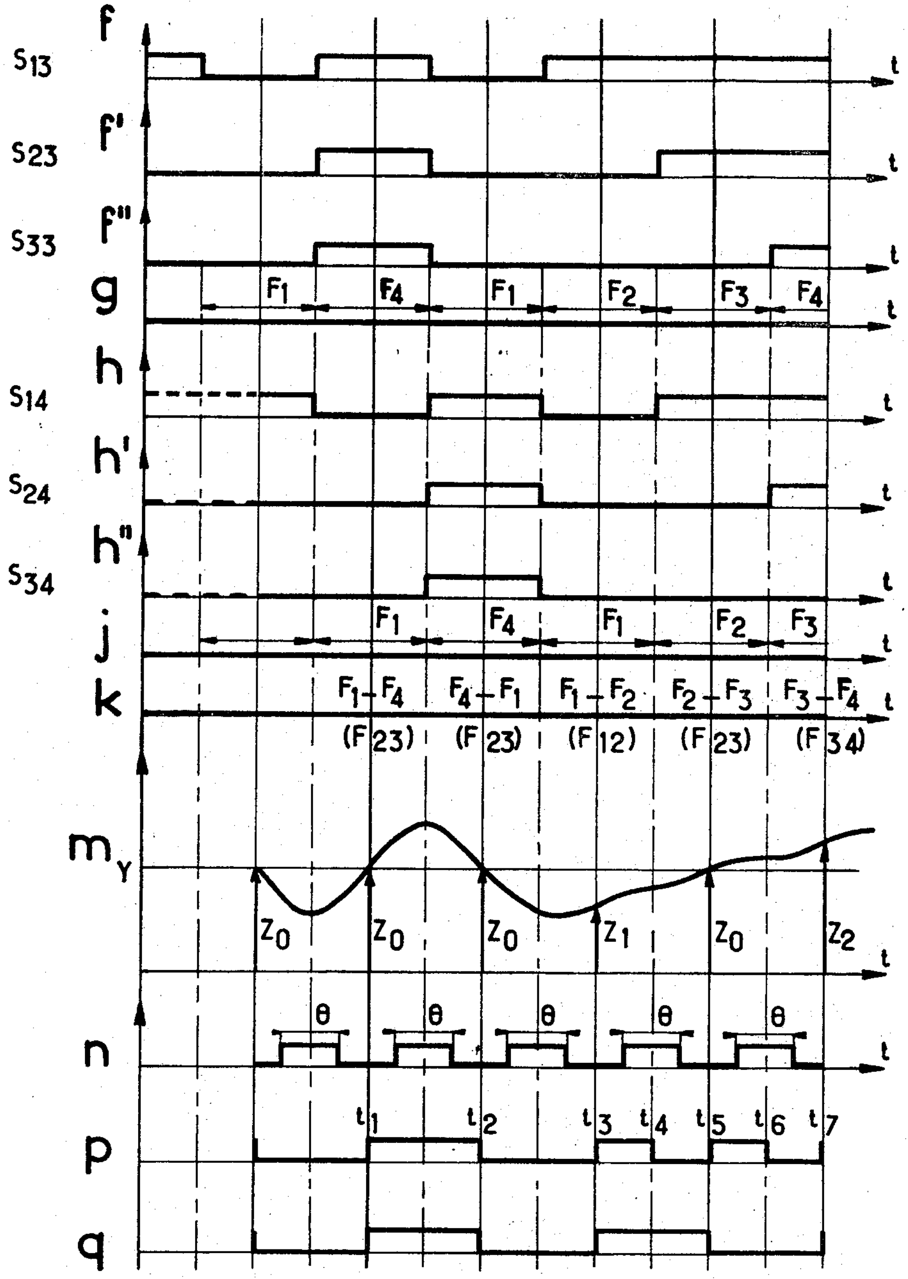

FIGS. 8*b* and 8*a* show a set of diagrams illustrating the form of the signals at different points of the circuit in a particular example of quadrivalent modulation.

Figure 1:
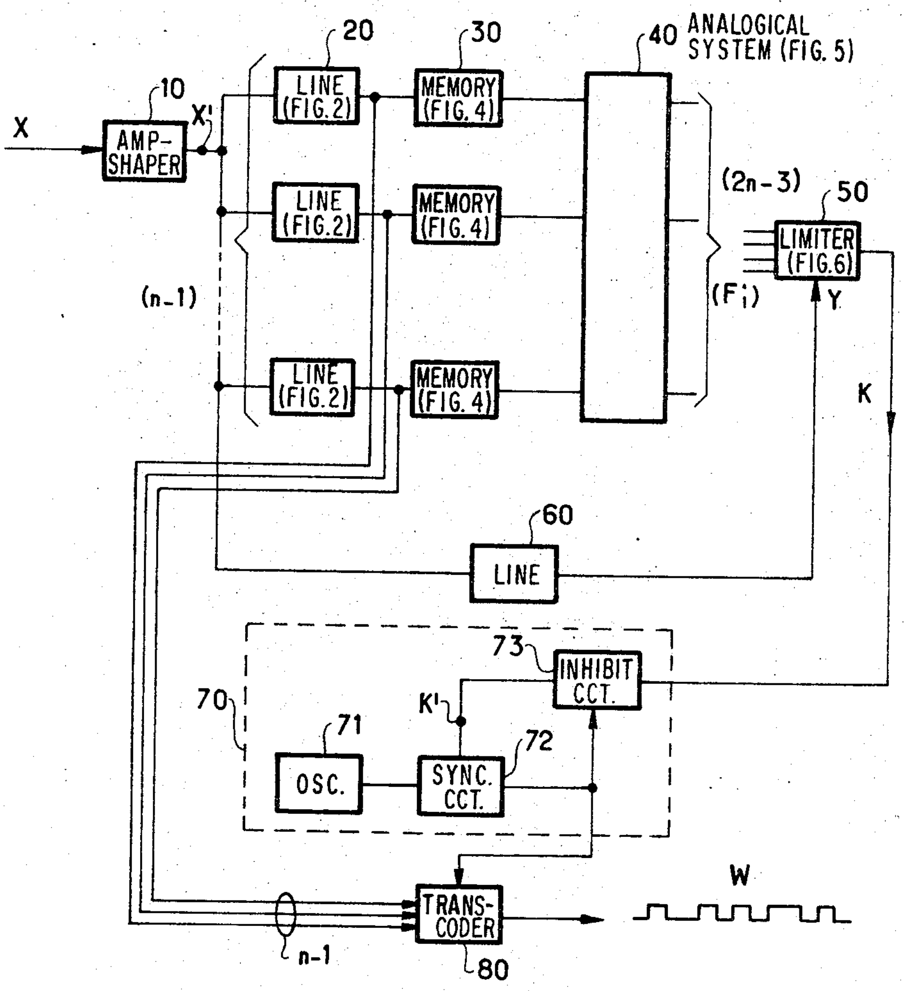
FIG. 1 illustrates an overall block diagram of a system according to the invention.

In FIG. 1, an amplifying and forming or shaping circuit 10 receives a wave X, frequency-modulated according to a code employing $n$ valencies. This circuit feeds a signal X' to the input of $(n-1)$ auto-correlation lines 20. Each of these lines is followed by a memory circuit 30. The said $(n-1)$ memory circuits act on an analogical system 40 comprising $(2n-3)$ output points $(F'_1)$ which serve the purpose of controlling the chopping level Z of a variable threshold amplitude limiter 50, which receives the output signal Y of an *n*th auto-correlation line 60 which, like the preceding ($n$—1) lines, is acted upon by the signal X', but unlike the other lines does not possess an amplitude limiter as its output.

A signal K issuing from the variable threshold amplitude limiter 50 is applied to a timing circuit 70, which comprises an oscillator 71 operating at a frequency advantageously set at 32 times the telegraphic speed, a synchronizing circuit 72 which receives a signal K' from an inhibitor circuit 73 acted upon by the said signal K.

The synchronized timing system feeds an output signal H to the ($n$—1) memory circuits cited above on the one hand, as well as to a transcoder 80 of known type, which at ($n$—1) input points receives the output signals of the said ($n$—1) auto-correlation lines, and delivers an output of a bivalent series signal W. The reception transcoder essentially comprises ($n$—1) input displacement registers and a set of conditioning devices. In the case of quadrivalent modulation, the data flow in the output stage is twice as fast as in the input shifting registers.

Figure 2:
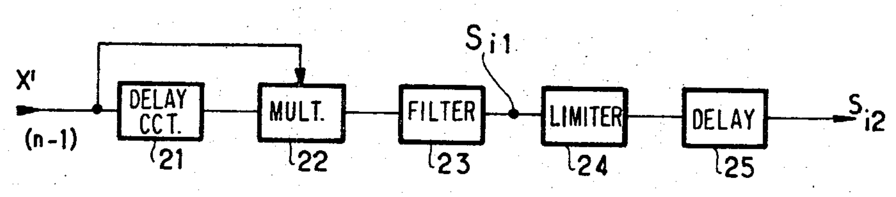
FIGS. 2, 4, 5 and 6 illustrate explicit diagrams of different details from FIG. 1.

FIG. 2 illustrates the structure of an auto-correlation line of optional order *i*.

The signal X' is fed directly to an input terminal of a multiplying circuit 22 and to another terminal of the same circuit through a dephasing or delaying circuit 21. A modulator, for example a modulator of the ring or link type, could be appropriate in the technology of numerical circuits which is preferably applied in the embodiment of the present invention, the function advantageously being accomplished by means of an "EXCLUSIVE OR" circuit, or else of a half adder circuit.

The dephasing circuit 21 may equally be provided in the form of a numerical circuit, for example a shift register, in which the period of transit of the data is proportional to the number of cells of the register and to the frequency of advance of the register.

All the dephasing circuits 21 of the ($n$—1) lines should as far as possible have the same delay, approximately equal to half a telegraphic instant, and provide an identical phase displacement $\phi$ (for example $\pi/2$) for one of the median frequencies, $F_{12}$, $F_{23}$, etc. Following the "EXCLUSIVE OR" circuit 22, the line comprises a low-pass filter 23 which eliminates the products of higher order, a fixed amplitude limiter 24 and a delaying element 25. A signal $S_{i1}$ is obtained at the output of the filter 23, and a signal $S_{i2}$ is obtained at the output terminal of the line. These signals are shown for a particular case in FIGS. 8*a* and 8*b*.

Figure 3:
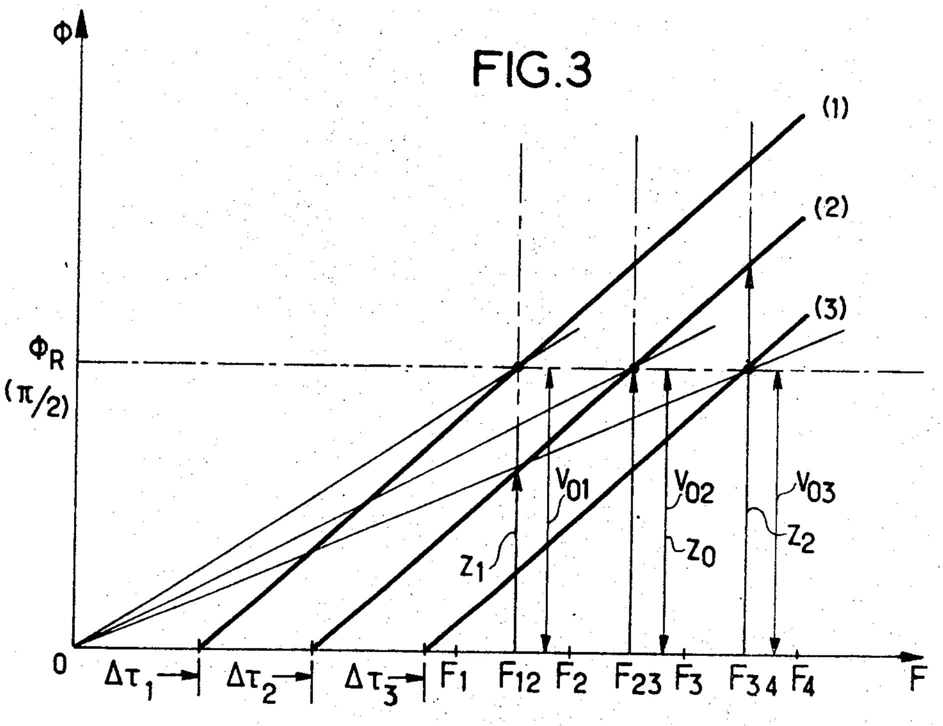
FIG. 3 illustrates displacement curves as a function of frequency, exemplifying the operation of the detail shown in FIG. 2.

In FIG. 3, the representative diagram is formed in the case of quadrivalent modulation, by the unbroken straight lines in a graph, $\phi=f(F)$, values $Z_1$, $Z_0$ and $Z_2$ representing the various chopping levels.

Filters of the scalar or grid type may be constructed to provide such curves. However, in contrast, circuits of the numerical or digital type will not provide parallel straight lines, but a grid of convergent lines passing through the point of origin, as shown dashdotted in FIG. 3. To balance this action, a corrective lagging circuit 25 causing an additional delay $\Delta Y$ is added after each line. The corrective circuits 25 also serve the purpose of correcting propagation period distortion in the range of telegraphic frequencies, for example 1200–2500 c./s.

The frequencies $F_1$ to $F_4$ possessing the values 1350, 1650, 1950 and 2250 c./s., the phase displacement has the reference value ($\pi/2$) in the line (1) for $F_{12}=1500$ c./s., in the line (2) for $F_{23}=1800$ c./s., in the line (3) for $F_{34}=2100$ c./s. At $V_{o1}$, $V_{o2}$ and $V_{o3}$, there has been plotted the values of the chopping levels of the elements 24 which are the same for the three lines, but correspond to different intermediate frequencies.

Figure 4:
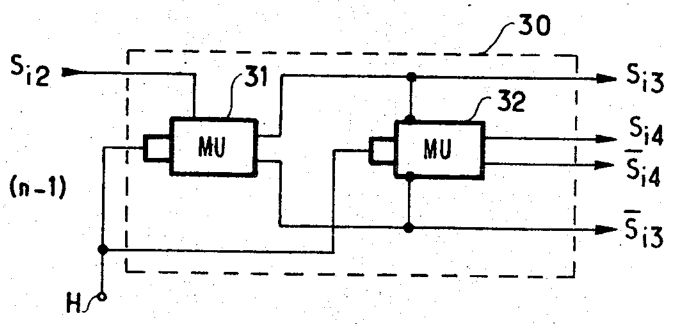

It is apparent from FIG. 4 that a memory circuit 30 (FIG. 1) may comprise a register with two stages 31 and 32, each consisting of a bistable switching element acted upon by the timing signals H. The switching element 31 is acted upon at a conditioning terminal by the signal $S_{i2}$; the output signals $S_{i3}$ and $\overline{S_{i3}}$ of the switching element 31 act on the two conditioning terminals of the switching element 32, which provides output signals $S_{i4}$ and $\overline{S_{i4}}$. A memory circuit 30 delivers four signals: $S_{i3}$, $\overline{S_{i3}}$, $S_{i4}$ and $S_{i4}$.

Figure 5:
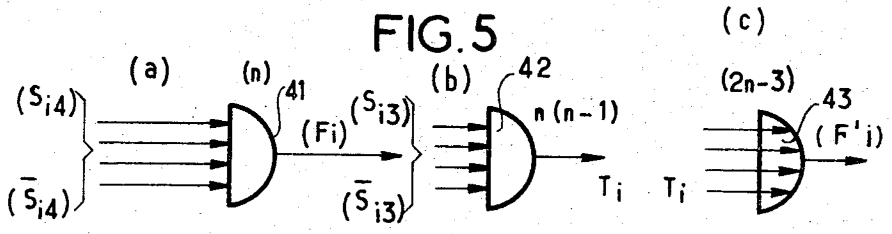

The state of the switching elements 32 characterizes the frequency passed, the state of the switching elements 31 characterizes the existing frequency. The combination of the two states renders it possible to determine each transition performed. These combinations are shown in principle in FIG. 5, which illustrates details of the item 40 in FIG. 1.

In FIG. 5*a* there is provided an AND circuit 41 receiving signals $S_{i4}$ and/or $\overline{S_{i4}}$ at ($n$—1) input terminals. There are *n* AND circuits 41, that is to say one for each frequency. Each of these delivers an analogical signal ($F_i$) characterizing one of the frequencies.

In FIG. 5*b* there is provided an AND circuit 42 receiving a signal ($F_i$) and ($n$—1) signals $S_{i3}$ and/or $\overline{S_{i3}}$ at *n* input terminals.

In FIG. 5*c* there is provided an OR circuit 43 which, at several input terminals, receives analogical signals corresponding to the total of the transitions for which the median frequency has a given value. There are ($2n$—3) of these circuits and of these analogical signals $F'_i$ at chopping levels Z (FIG. 3).

Figure 6:
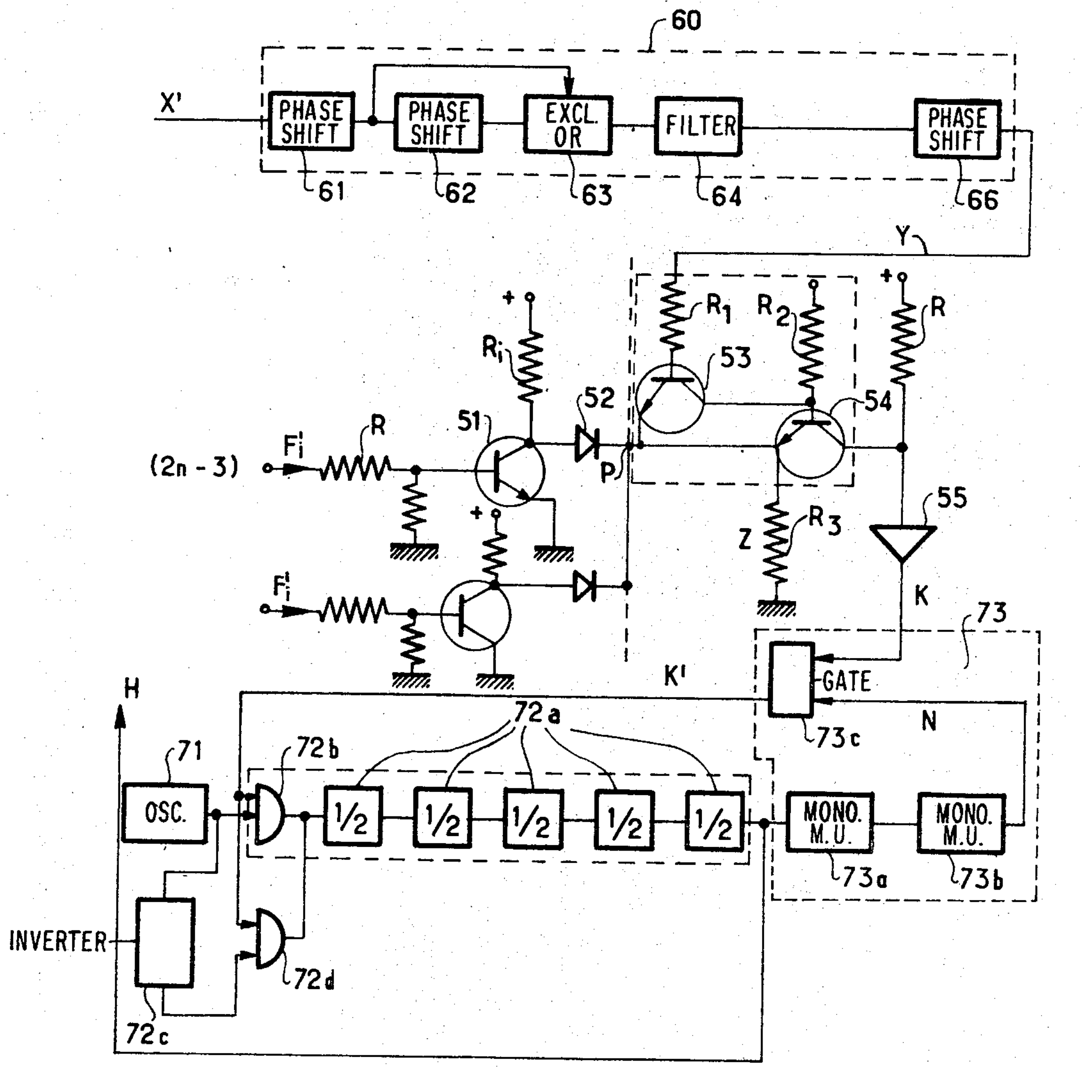

FIG. 6 shows the structure of the variable threshold amplitude limiter 50 of the additional line 60 and of the synchronized timing circuit 70 of FIG. 1.

At its entry, the line 60 comprises a first phase shifting circuit 61 external to the correlation circuit, a second phase shifting circuit 62, an "EXCLUSIVE OR" circuit 63, a low-pass filter 64, and a corrective phase shifter 66. It delivers a signal Y. Each of the two phase displacements corresponds to a delay of the order of a half instant.

The variable threshold amplitude limiter comprises two transistors 53 and 54, whose emitters are grounded through a shared resistor $R_3$. The base of the transistor 53 receives the output signal Y of the line 60 through a resistor $R_1$, whose base is connected to a direct current source through a resistor $R_2$. The output signal of the transistor 54 is amplified in the amplifier 55 which delivers the signal K.

At the point P common to the two emitters, there are connected ($2n$—3) circuits comprising a transistor 51, grounded through its emitter, its collector charged through a resistor $R_i$ different from one input to the other, being connected to the said point P through a diode 52. The base of the transistor 51 receives the signal $F'_i$ through a resistor R.

The output signal K of the amplifier 55 passes through an inhibitor gate 73 consisting of the elements 73*a*, 73*b* and 73*c* whose function will be explained hereinafter. The signal K' issuing from the inhibitor serves the purpose of synchronizing a timing mechanism, by employing a device such as that described in the French Pat. No. 1,179,769, dated July 23, 1957. This timing mechanism comprises an oscillator 71 operating on a frequency 16 times higher (for example) than the telegraphic frequency. The signals emitted by the oscillator 71 pass through a divider comprising five binary stages 72*a* which delivers the timing signals H. The signals of the oscillators 71 pass through an AND gate 72*b* and are not transmitted unless they coincide with a signal K'. If a signal K' appears in the absence of a pulse from the oscillator 71, it is transmitted by a gate 72*d* whereof an input terminal receives the complement of the signal of the oscillator 71 through an inverter 72*c*.

The inhibiting circuit preferably comprises two monostable switching elements 73*a* and 73*b* for adjustment of the lagging period, the second 73*b* opening a gate 73*c* during a period approximately equal to half a telegraphic instant, whose middle occurs approximately at the time in which the synchronized timing system pulse is to occur. In this way, if a parasitic or interference transition were to occur during the remaining period of the telegraphic instant, it is not fed into the synchronizing circuit, which it would disturb. Synchronized timing system signals H issue from the unit 72*a* which divides by 76. The synchronization essentially consists of setting the local timing system (H) to the cadence of the pulses received, by elimination of divisional pulses at the output of the oscillator 71 (in this case fractions of one sixteenth of the timing period).

Figure 7:
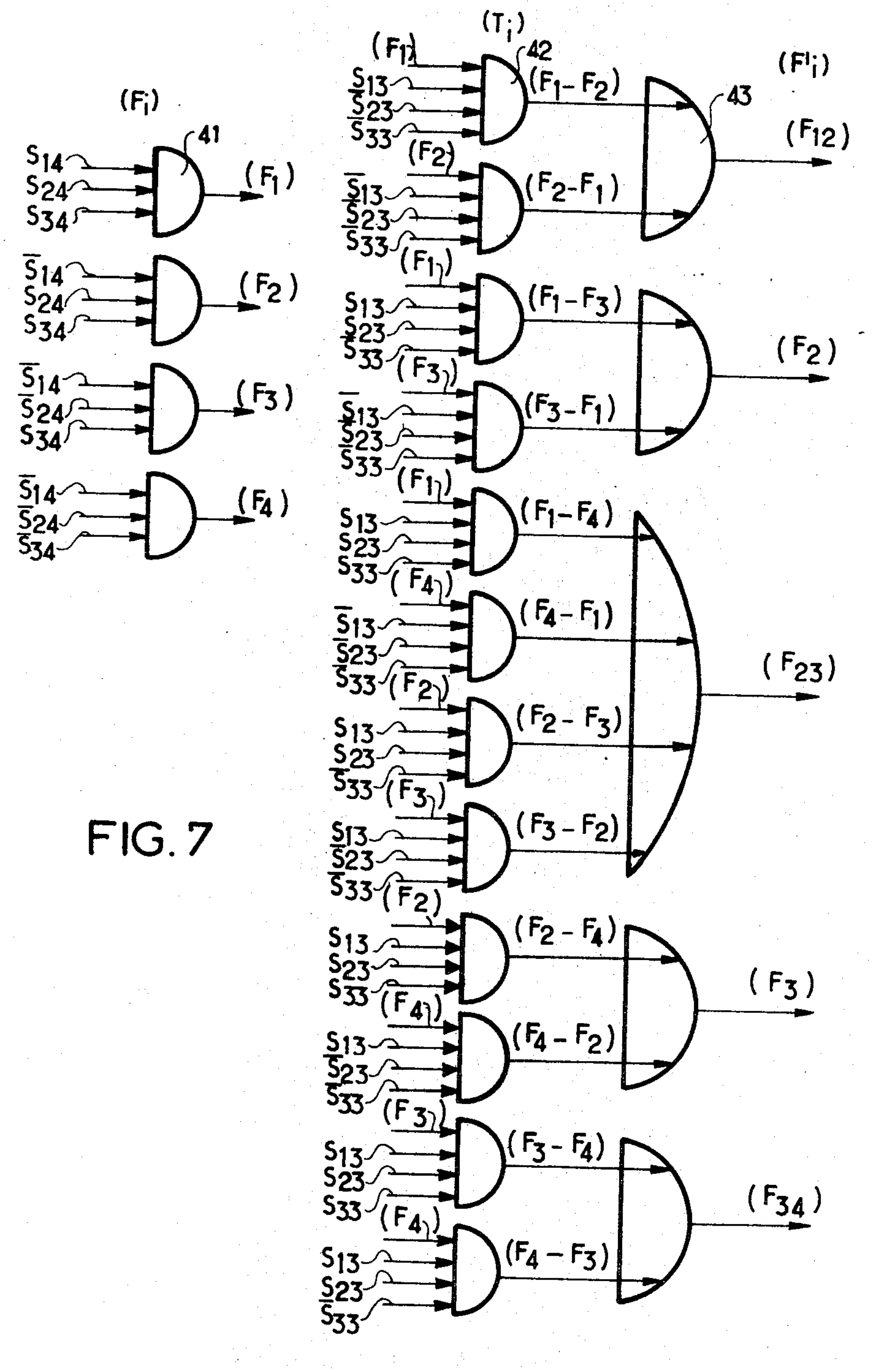
FIG. 7 illustrates the detailed structure of analogical circuits representing the detail shown in FIG. 5 in the special case of quadrivalent modulation.

For quadrivalent modulation on four frequencies $F_1$, $F_2$, $F_3$ and $F_4$, and three intermediate frequencies $F_{12}$, $F_{23}$ and $F_{34}$, FIG. 7 shows the example of the system 40 including four AND circuits 41, each with three input terminals, AND circuits 42 of which there are twelve, each comprising four input terminals, and the five OR circuits 43, whereof four possess two input terminals and one possesses four input terminals.

FIGS. 8*a* and 8*b* are a set of diagrams showing the shape of the signals at different points of the circuit in a particular case of quadrivalent modulation.

The graph (*a*) provides an arbitrarily chosen example of the modulation valencies (1, 2, 3, 4) in the course of six consecutive instants. For example, the frequencies are, in cycles per second:

| | |
|---|---|
| $F_1$ | 1350 |
| $F_{1-2}$ | 1500 |
| $F_2$ | 1650 |
| $F_{2-3}$ | 1800 |
| $F_3$ | 1950 |
| $F_{3-4}$ | 2100 |
| $F_4$ | 2250 |

It is apparent that in the example of line (*a*) these valencies are: $F_1$–$F_4$–$F_1$–$F_2$–$F_3$–$F_4$.

The graphs (*b*) and (*b'*) show the signals $S_{11}$ and $S_{12}$, the graphs (*c*) and (*c'*) show the signals $S_{21}$ and $S_{22}$, the graphs (*d*) and (*d'*) show the signals $S_{31}$ and $S_{32}$. The values of the chopping levels $V_{01}$, $V_{02}$, $V_{03}$, which are equal but correspond to different frequencies for the three lines, have been plotted in FIG. 3. The graph (*e*) shows the signals H provided by the synchronized timing system 70.

The signals $S_{13}$, $S_{23}$ and $S_{33}$ are apparent at (*f*), (*f'*) and (*f''*), and the signals $S_{14}$, $S_{24}$ and $S_{34}$ are apparent at (*h*), (*h'*) and (*h''*). For each instant, the present frequency has been plotted at (*g*), and the former frequency at (*j*). The identification of the transitions is deduced therefrom, at (*k*).

The signal Y with the corresponding chopping levels has been plotted at (*m*). These levels $Z_0$, $Z_1$ and $Z_2$ are those which correspond to the related transition frequencies $F_{23}$, $F_{12}$ and $F_{34}$ on the curve (2) of FIG. 3.

The inhibiting signals, lasting for a period $\theta$, and reaching the inhibitor along the line N, have been plotted at (*n*). The output signals K of the variable chopper have been plotted at (*p*). The signals K' issuing from the inhibitor circuit are depicted at (*q*).

The positional change of the variable chopper occurring at the times $T_1$, $t_2$, $t_3$, $t_4$, $t_5$, $t_7$, a parasitic or interference transition would cause a signal at $t_4$ and $t_6$ if the transmission of the signal K (FIG. 6) were not blocked during the period $\theta$.

I have shown and described one embodiment in accordance with the present invention. It is understood that the same is not limited thereto but is susceptible of numerous changes and modifications as known to a person skilled in the art and I, therefore, do not wish to be limited to the details shown and described herein, but intend to cover all such changes and modifications as are encompassed by the scope of the appended claims.

What I claim is:

1. A demodulator for a multivalent telegraphic signal modulated in frequency at *n* valencies with *n* frequencies corresponding to the *n* valencies, comprising a plurality of first auto-correlation lines each including in series circuit a first delay circuit, a multiplication element connected to the output and input of said first delay circuit performing a multiplication of the signals derived therefrom, a low-pass filter, and a fixed amplitude limiter, a transcoder having a plurality of inputs connected to said first auto-correlation lines, a transition detection element connected to the output of each of said auto-correlation lines, logical circuit means connected to the outputs of said transition detection elements for identifying the transition frequencies of the signals derived from said detection elements, a variable threshold amplitude limiter connected to said logical circuit means which sets the threshold thereof, a second auto-correlation line similar to said first auto-correlation line including only a first delay circuit, a multiplication element and a low-pass filter connected to be controlled by the threshold of said variable threshold amplitude limiter, and timing means connected to the output of said variable threshold amplitude limiter for generating timing signals applied to said transcoder which produces elementary binary signals in series.

2. A demodulator as defined in claim 1 wherein said transition detection element includes a register having two binary switching stages which for any instant and at the output of the corresponding first auto-correlation line provides analogical signals characteristic of the frequency during two consecutive instants of said telegraphic signal.

3. A demodulator as defined in claim 2 wherein $(n-1)$ first auto-correlation lines are provided, said logical means providing $(2n-3)$ output terminals connected to said variable threshold amplitude limiter to adjust the threshold thereof.

4. A demodulator as defined in claim 3 wherein each of said first delay circuits is provided in the form of a phase shifter.

5. A demodulator as defined in claim 4, in which each of the phase shifters provides a reference phase displacement, for example 90°, for one of $(n-1)$ frequencies, respectively.

6. A demodulator as defined in claim 3, in which the said logical circuit means comprises a first series of *n* AND circuits possessing $(n-1)$ input terminals, receiving signals derived from the second switching stage of one of the said registers, a second series of $n(n-1)$ AND circuits possessing *n* input terminals receiving signals derived from the first switching stage of one of the said registers and a signal derived from one of the AND circuits.

7. A demodulator as defined in claim 6, in which the said variable threshold amplitude limiter possessing $(2n-3)$ threshold control input terminals is set to a level corresponding to an intermediate frequency which characterizes a transition incurred by a signal received from one of the $(2n-3)$ output terminals of the said set of logical circuit means by means of a device comprising $(2n-3)$ lines, each of the latter comprising one transistor and one switching diode.

8. A demodulator as defined in claim 7, in which one of the $(n-1)$ first auto-correlation lines comprises a complementary corrective phase shifter, provided so as to produce a period of equivalent delay of the order of half a telegraphic instant.

9. A demodulator as defined in claim 8, in which the input section of said second auto-correlation line moreover comprises a delaying element causing a delay of half an instant.

10. A demodulator as defined in claim 11, in which the said timing means comprises an inhibitor circuit actuated by a timing pulse delayed by a period adjusted in such manner as to suppress parasitic and interference transitions.

11. A demodulator as defined in claim 10, in which the phase shifters are of the numerical or digital type, and preferably comprise registers.

12. A demodulator as defined in claim 1, in which multiplication elements are of the numerical or digital type, preferably of the "EXCLUSIVE OR" type.

No references cited.

JOHN KOMINSKI, Primary Examiner